United States Patent [19]

Schmieder

[11] Patent Number: 4,672,855

[45] Date of Patent: Jun. 16, 1987

[54] DEVICE FOR MEASURING FORCES AND TORQUE IN DIFFERENT DIRECTIONS

[76] Inventor: Lothar Schmieder, Gernholzweg 4, 8031 Gilching, Fed. Rep. of Germany

[21] Appl. No.: 860,121

[22] Filed: May 6, 1986

[30] Foreign Application Priority Data

May 6, 1985 [DE] Fed. Rep. of Germany ....... 3516234

[51] Int. Cl.$^4$ ............................ G01L 5/16; G01L 1/26
[52] U.S. Cl. ................................. 73/862.04; 73/862.67
[58] Field of Search ........... 73/862.04, 862.05, 862.06, 73/862.67

[56] References Cited

U.S. PATENT DOCUMENTS

| | | | |
|---|---|---|---|
| 3,693,425 | 9/1972 | Starita et al. ..................... | 73/862.04 |
| 3,780,573 | 12/1973 | Reus .............................. | 73/862.04 X |
| 4,138,884 | 2/1979 | Ruoff, Jr. et al. ................ | 73/862.04 |
| 4,448,083 | 5/1984 | Hayashi ............................ | 73/862.04 |

FOREIGN PATENT DOCUMENTS 3213319 10/1982 Fed. Rep. of Germany .

*Primary Examiner*—Charles A. Ruehl
*Attorney, Agent, or Firm*—Becker & Becker, Inc.

[57] ABSTRACT

A device for measuring forces and torque in different directions. The device includes a rigid, round hub and an annular flange that is disposed parallel to the hub. The flange and the hub are connected to one another via four spokes that are arranged in the shape of a cross. The spokes are deformed by a load due to their dimensions. Such a deformation is measured with the aid of elongation-measuring strips, with the hub and flange remaining rigid. The inner ends of the spokes are secured in the hub, while the outer ends are secured to the flange via thin members, the thickness and diameter of which are such that the members yield readily in response to transverse forces and torsion of the spokes about their axes, while tangential displacements are substantially eliminated. The diameter of each member is at least 2.5 times as great as the diameter of the spokes, and the thickness of a given member has an upper limit. Such a device assures a high sensitivity to measurements, and a separation of the load components.

7 Claims, 18 Drawing Figures

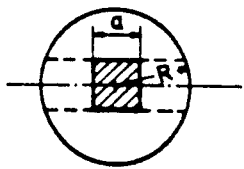
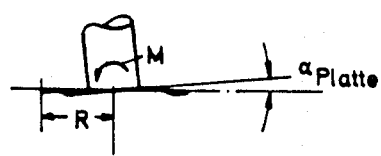
Fig. 5a  Fig. 5b
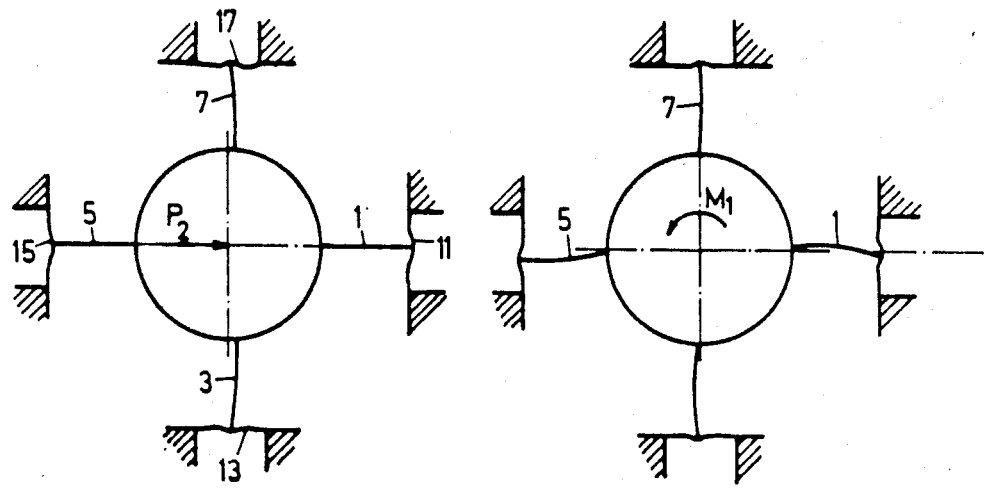
Fig. 6.1  Fig. 6.2
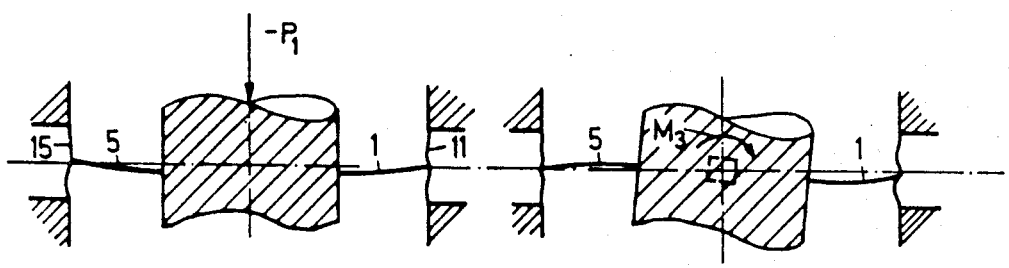
Fig. 6.3  Fig. 6.4

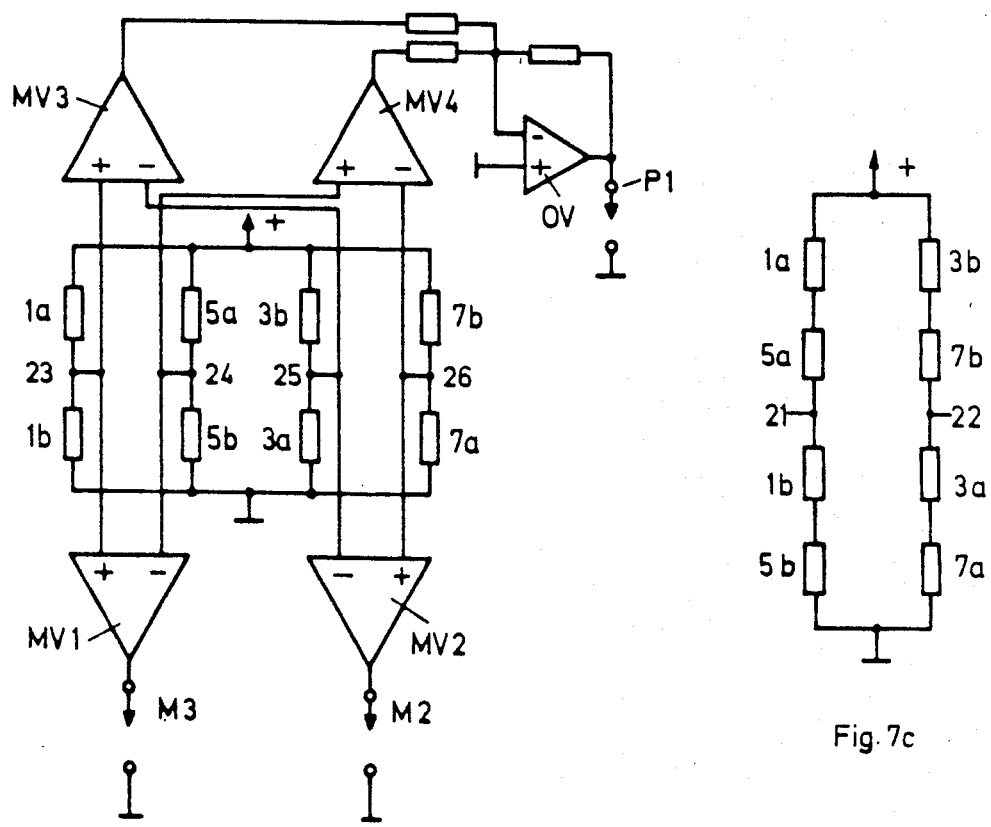
Fig. 8
Fig. 7c
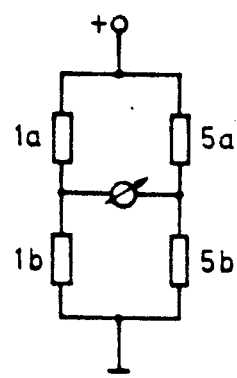
Fig. 7b
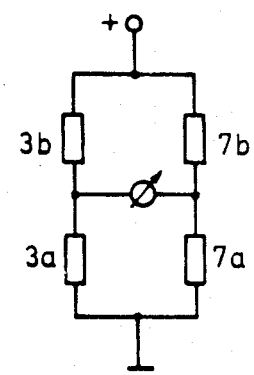
Fig. 7a

DEVICE FOR MEASURING FORCES AND TORQUE IN DIFFERENT DIRECTIONS

BACKGROUND OF THE INVENTION

The present invention relates to a force and torque sensing element, and in particular to a device for measuring forces and torque in different directions. The device includes a rigid, round hub, and an annular flange that is disposed parallel to the hub. The flange and hub are connected to one another via four spokes that are arranged in the shape of a cross. The spokes are secured in the hub, and are deformed by a load due to their dimensions. Such a deformation is measured with the aid of elongation-measuring strips, with the hub and flange themselves remaining rigid.

Known sensing elements (sensors) of this general type measure the force between two connection or mounting flanges in three directions, which are at right angles to one another, independent of the point of application; the same applies to the torque (a total of six components). Many of these sensors operate on the basis of elongation-measuring strips, in connection with which it has been shown to be expedient to connect the mounting flanges by easily deformable rods, the deflection or bending of which was measured (see, for example, German Offenlegungsschrift No. 32 13 319 A1), permitting conclusions to be made with regard to the load forces and moments.

In a manner similar to that of the aforementioned German Offenlegungsschrift No. 32 13 319 A1, the inventive sensor comprises a central hub N (see FIGS. 4a and 4b) and an outer, annular flange F, with the hub and flange being interconnected by four spokes, 1, 3, 5, and 7 that are secured to the hub. Fixed to all four sides of each spoke, as close as possible to the location of securement of the latter, are elongation-measuring strips, for example 1a, 1b, 2a, 2b, etc. (see FIGS. 4a and 4b). Deflections of the spokes not only in the plane of the flange, but also in a plane disposed at right angles thereto, can be measured by these elongation-measuring strips.

As can be seen from FIG. 10 of the aforementioned German Offenlegungsschrift No. 32 13 319 A1, the spoke ends are secured to thin plate-like strips (designated cords 19, 20, 21, 22), so that when a force occurs, for example in the X-direction, the spokes 11, 12 can be easily displaced in the X-direction, i.e. at right angles to the plane of the cords 19 and 20. The spokes 13 and 14 are held securely in place in the direction of the tangents of the cords 21 and 22, so that these spokes bend or twist, whereby the tangential force in the X-direction can be measured. However, when an external torque occurs, for example in the X-direction, this arrangement does not preclude operation in the transverse direction, i.e. at right angles to the plane of the drawing of FIG. 10, since the cords 21, 22 actually prevent tangential displacements in the longitudinal direction of the cords. This shortcoming is remedied in the arrangement shown in FIG. 3 of the aforementioned Offenlegungsschrift via an additional support member that is disposed at right angles to the cords; however, this leads to an expensive construction.

It is an object of the present invention to provide an effective device of the aforementioned general type that eliminates the drawbacks of the known arrangements, while being economical to produce.

BRIEF DESCRIPTION OF THE DRAWINGS

This object, and other objects and advantages of the present invention, will appear more clearly from the following specification in conjunction with the accompanying drawings, in which:

FIG. 5a is a cross-sectional view through a spoke, with a view of the associated circular member;

FIG. 5b is a cross-sectional view through a circular member along with the spoke that is secured thereto, with the spoke being pivoted by the moment M;

FIG. 6.1 is a horizontal cross-sectional view through one inventive embodiment with an exaggerated illustration of the deformation of the spokes and the circular members under the influence of a tangential force $P_2$;

FIG. 6.2 is a horizontal cross-sectional view similar to that of FIG. 6.1, but under the influence of a torque $M_1$;

FIG. 6.3 is a vertical cross-sectional view through one exemplary embodiment with an exaggerated illustration of the deformation of the spokes and the circular members under the influence of a perpendicular force $P_1$;

FIG. 6.4 is a vertical cross-sectional view similar to that of FIG. 6.3, but under the influence of a tangential moment $M_3$;

FIGS. 7a and 7b show bridge circuitry of the elongation-measuring strips for measuring the tangential torques $M_2$ and $M_3$ respectively;

FIG. 7c shows the bridge circuitry of the elongation-measuring strips for measuring the perpendicular force $P_1$; and FIG. 8 shows the bridge circuitry for measuring $M_2$, $M_3$, and $P_1$ employing double utilization of the elongation-measuring strips.

SUMMARY OF THE INVENTION

Pursuant to the present invention, the two-dimensional fixing of the spoke end is achieved by securing the spoke ends 1, 3, 5, 7 to the center of thin circular members or sheets 11, 13, 15, 17 that are fixedly secured in the flange F, with their diameter 2R and thickness h being such that the spoke ends can be easily pivoted in a direction at right angles to the plane of the member, while tangential displacements in all directions of the planes of the members are prevented by the membrane forces. The diameter of the member should be at least 2.5 times as great as the diameter of the spokes. These relationships are subsequently quantitatively demonstrated (see also Timoshenke, Woinowski-Krieger, "The theory of plates and shells", MacGraw Hill 1959).

Figure 1:
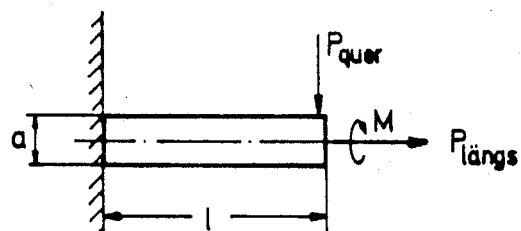
FIG. 1 shows a bar having a square cross-sectional shape, the lateral length "a", and the length l, with the bar being subjected to a transverse force $P_{quer}$ and a torque M.
Figure 1A:
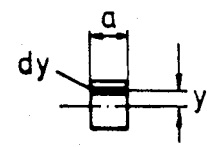
FIG. 1a is a cross-sectional view through the bar of FIG. 1, and shows a surface element having the height dy.

Since with the present invention it is necessary to understand the elastic behavior of the bars and members under various load conditions, there will first be described a bar (see FIG. 1) that is secured at one end and has a square cross section (width=height=a, length=l). A longitudinal force P generates the elongation $$\epsilon_{P/D} = \frac{\sigma}{E} = \frac{P}{a^2 E} \tag{1}$$

where $\sigma$ equals normal stress, E equals the modulus of elasticity, and Z/D indicates tension-compression stress. A transverse force of the identical magnitude generates at the securement end the torque $$M = Pl \tag{1.1}$$

which is counter-balanced by a bending moment of the same magnitude that generates the normal stresses that occur in the cross-sectional securement area (see FIG. 1a).

With a linear stress distribution (Bernoulli's Hypothesis), the bending stress at the distance y from the center of the bar (the neutral axis) is given by the equation $$\sigma(y) = \frac{\sigma_0}{y_0} y \tag{1.2}$$

where the $\sigma_0$ equals the stress at the location $y_0$.

This bending stress generates the bending moment $$M = a \int_{-a/2}^{a/2} y\sigma(y) dy = \frac{\sigma_0}{y_0} J \tag{1.3}$$

with the surface angular impulse relative to the x-axis $$J = a \int_{-a/2}^{a/2} y^2 dy = a^4/12 \tag{1.4}$$

For $y_0 = a/2$, $\sigma_0 = \sigma_{max}$, and from equation 1.3 the maximum elongation that occurs during bending can be calculated $$\epsilon_B = \frac{\sigma_{max}}{E} = \frac{M}{EJ} a/2 = \frac{6M}{Ea^3} = \frac{6Pl}{Ea^3} \tag{1.5}$$

Figure 1B:
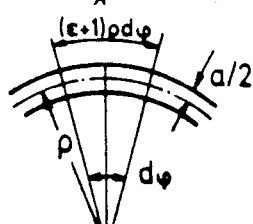
FIG. 1b illustrates the circularly twisted bar of FIG. 1, and shows the radius of curvature and the elongation at the surface.

Due to the load or stress, the bar is deflected, and the curvature of the bending line w(x) or the reciprocal radius of curvature $1/\rho$ is proportional at each location x to the maximum elongation, as can be observed from FIG. 1b:

$$\frac{d^2 w}{dx^2} = 1/\rho = \frac{\epsilon_B}{a/2} \tag{1.51}$$

At the location x, the equation $M = P(l-x)$ is to be placed in equation 1.5, and the placement of $\epsilon_B$ in equation 1.51 gives the differential equation of the bending line, and after integration thereof:

$$\frac{d^2 w}{dx^2} = \frac{P}{EJ} (l - x), \tag{1.52}$$

$$\frac{dw}{dx} = \frac{P}{EJ} (lx - x^2/2),$$

$$w(x) = \frac{P}{EJ} (lx^2/2 - x^3/6).$$

At the free end $x=l$ of the bar the maximum torsion of the tangents $\alpha_B$ and the maximum deflection $f_B$ occur:

$$\alpha_B = \frac{6Pl^2}{Ea^4} = \frac{6Ml}{Ea^4}, \tag{1.53}$$

$$f_B = \frac{4Pl^3}{Ea^4}. \tag{1.54}$$

Figure 2:
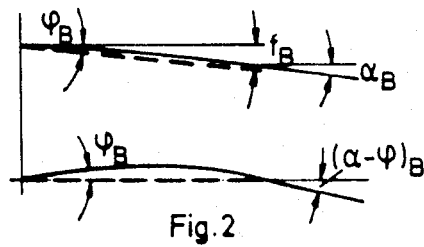
FIG. 2 shows the deflection curve of the bar of FIG. 1 when it is subjected to a transverse force.

The cord, which is pulled from the starting point to the end point, has the slope (see FIG. 2)

$$\phi_B = \frac{f_B}{l} = \frac{4Pl^2}{Ea^4} = \frac{4Ml}{Ea^4}. \tag{1.55}$$

If the cord is twisted in the horizontal, the end tangent has the slope $$(\alpha - \phi)_B = \frac{2Pl^2}{Ea^4} = \frac{2Ml}{Ea^4}. \tag{1.56}$$

A comparison of equations 1 and 1.5, $$\epsilon_B/\epsilon_{P/D} = 6l/a, \tag{1.57}$$

shows that for $l/a = 4$, the elongation $\epsilon_B$ is 24 times as great as the $\epsilon_{E/D}$, which, of course, is due to the fact that during bending the deformation is concentrated at the securement location, and with tension and compression is uniformly distributed over the length of the bar.

Figure 3:
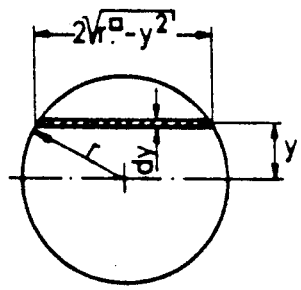
FIG. 3 is a cross-sectional view through a round bar that has a surface element having the height dy.

For the torsion of a bar, the following equation, which is analogous to equation 1, applies $$\gamma = \tau/G \tag{2}$$

where the $\tau$ equals the tangential stress, $\gamma$ equals torsional-shear strain, G equals the shearing modulus of elasticity. The torsional-shear strain or angle of shearing deformation $\gamma$ is that angle by which the original right angle of a square changes. The relationship between the shearing modulus of elasticity G and the modulus of elasticity is given by the following equation $$G = \frac{m}{2(m + 1)} E = 0.382 E \tag{2.1}$$

where m is the reciprocal poisson constant.

$$m = 1/\nu = 10/3 \tag{2.11}$$

Where a circular cross section is encountered, $\tau$ is a linear function of y, and in a manner similar to equations 1.2, 1.3, and 1.4 (see FIG. 3)

$$\tau(y) = \frac{\tau_0}{y_0} y, \tag{2.2}$$

-continued $$M = \frac{\tau_0}{y_0} J_{pol}, \quad (2.3)$$

with the polar angular impulse $$J_{pol} = 4 \int_0^r \sqrt{r^2 - y^2} \, y^2 dy = \frac{\pi r^4}{2}, \quad a(y)y^2 dy = 4 \int_0^r \quad (2.4)$$

and with $y_0 = r$, there is obtained $$\tau_{max} = \tau(r) = \frac{Mr}{J_{pol}} = \frac{2M}{\pi r^3}, \gamma_{max} = \frac{2M}{G\pi r^3}. \quad (2.5)$$

Figure 3A:
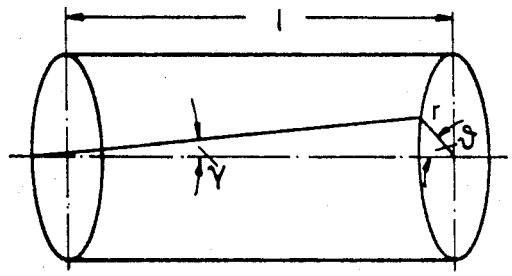
FIG. 3a shows the torsion of the round bar of FIG. 3 over the length l.

If the bar has the length l, a point on the surface of the free end of the bar shifts by the distance $$\gamma_{max} l = \theta r \quad (2.51)$$

in the radial direction (see FIG. 3a), whereby $$\theta = \frac{Ml}{GJ_{pol}} \quad (2.52)$$

denotes the torsion angle. Since if a circular cross section is not involved, $\tau$ is no longer a linear function of y, the equations 2.5 and 2.52 are to be replaced in accordance with de St. Venant $$\gamma_{max} = \frac{M}{0.208 \, Ga^3} = \frac{12.49 \, M}{Ea^3}, \quad (2.6)$$

$$\theta = \frac{7.11 \, lM}{Ga^4} = \frac{18.47 \, Ml}{Ea^4}. \quad (2.7)$$

A comparison of equations 1.55 and 2.7 yields $$\theta/\rho_B = 4.62. \quad (2.8)$$

A bar having a square cross section is 4.62 times more yielding relative to torsion than relative to a twisting of the starting tangent.

DESCRIPTION OF PREFERRED EMBODIMENTS

Referring now to the drawings in detail, the aforementioned formulas will subsequently be applied to the deformations of the sensor of FIG. 4.

To begin with, the load situation of FIG. 6.1 will be considered. The tangential force $P_2$ displaces the hub N, in the process of which the members or sheets 11 and 15 bend. After inserting the relationship $$\beta = 2R/a \quad (3)$$

the following equation applies to the bending or deflection of the member $$f_{member} = k_1(\beta)\beta^2 \frac{Pa^2}{Eh^3} \quad (3.1)$$

$k_1$ is a function of $\beta$, and has the values indicated in column 3 of Table 1.

TABLE 1

| $\beta$ | k | $k_1$ | $k_1\beta^2$ | h | $\frac{\alpha_{member}}{\alpha_B}$ | $\frac{f_B}{v_{tang}}$ |
|---|---|---|---|---|---|---|
| 3 | 0.703 | 0.062 | 0.568 | 0.26 | 32.4 | 27.4 |
| 4 | 0.933 | 0.092 | 1.472 | 0.35 | 13.2 | 24.6 |
| 5 | 1.13 | 0.114 | 2.85 | 0.44 | 6.7 | 23.2 |

The force P is essentially to be absorbed by the spokes 3, 7, which are deflected by the amount $f_B$ (see equation 1.54). $f_{member}$ must therefore be greater than $f_B$. It is therefore necessary that $$\frac{f_{member}}{f_B} = \frac{k_1\beta^2}{4}\left(\frac{a^2}{hl}\right)^3 \geq 10 \quad (3.2)$$

With $a = 4$ mm, $l = 15$ mm, and $E = 21,000$ kp/mm², there follows from equation 3.2 the values for h indicated in column 5 of Table 1. Equation 3.2 is a relationship that limits the upper value of h. Depending upon the selection of h, one must check whether the value $$\epsilon_{max} = \frac{kP}{Eh^2} \quad (3.21)$$

(having the k values from the second column of Table 1) exceeds the elongation that is permissable for the material utilized.

In the following discussion, it will be assumed that the material is structural steel. However, it should be noted that other metals, especially aluminium, could also be used. It would also be conceivable to use fiber-reinforced synthetic materials to achieve low torsional strength and high flexural stiffness (see equation 2.8). Where precision is not important, the entire sensor can be made of cheap plastic.

After equation 3.2 has been satisfied, it is still necessary that the outer tangents of the spokes 3, 7 be able to be easily pivoted relative to the normal line of the members. The equation $$\alpha_{member} = \frac{M}{5Eh^3} \quad (3.3)$$

describes what bending moment M must be excerted upon spoke 3 or 5 in order to pivot the end tangents by the angle $\alpha_{member}$. A comparison with equation 1.53 yields $$\frac{\alpha_{member}}{\alpha_B} = \frac{a^4}{30h^3l} \quad (3.4)$$

with the values indicated in column 6 of Table 1. Thus, the spokes can be viewed as being free in all directions.

It must finally also be confirmed that tangential displacements are suppressed. To evaluate, in FIG. 5a the horizontal strips having the width "a" are considered. Here, the force P generates the elongation $$\epsilon = \frac{P}{2ahE} \quad (3.5)$$

and a displacement of the spoke end $$v_{tang} = \epsilon(\beta - 1) a/2 = \frac{P(\beta - 1)}{4hE} \quad (3.51)$$

A comparison with equation 1.55 yields $$\frac{f_B}{v_{tang}} = \frac{16l^3 h}{a^4(\beta - 1)} \quad (3.52)$$

having the numerical values indicated in column 7 of Table 1. These values confirm that $v_{tang}$ is quite small relative to $f_B$.

Similar elastic deformations occur in the load conditions depicted in FIGS. 6.2 and 6.3.

In the load condition indicated in FIG. 6.4, the spokes 1 and 5 are bent, and the spokes 3 and 7 are twisted. A calculation similar to that carried out above shows that the membrane forces in the circular disk prevent a twisting of the spoke about its longitudinal axis. However, since the spoke (see equation 2.8) is much more yielding with regard to deflection than with regard to twisting, 78% of the torque $M_3$ is absorbed by the spokes 1 and 5. Therefore, a significant change in cross-sectional area at the outer ends, as required in German Offenlegungsschrift No. 32 13 319 A1, is not necessary. Table 2 shows the six possible load conditions (all others are a combination of these), along with the associated deformations.

TABLE 2

| No. | Load | Bending of spoke numbers |
|---|---|---|
| 1 | $P_2$ | 3 and 7 in the plane of the flange |
| 2 | $P_3$ | 1 and 5 in the plane of the flange |
| 3 | $M_1$ | 1, 3, 5, 7 in the plane of the flange |
| 4 | $M_2$ | 3 and 7 perpendicular to the plane of the flange |
| 5 | $M_3$ | 1 and 5 perpendicular to the plane of the flange |
| 6 | $P_1$ | 1, 3, 5, 7 perpendicular to the plane of the flange |

The slight tension and compression deformations, as well as the slight shearing deformations, that occur in addition to the bending deformations are not measured if the measuring strips are mounted exactly parallel to the longitudinal direction of the spokes. The load situations 1 to 3 are measured by the half-bridges 2a and b, 4a and b, 6a and b, 8a and b, while the load situations 4 to 6 are measured by the half-bridges 1a and b, 3a and b, 5a and b, 7a and b. Within each of these two groups, a differentiation is made between forces and moments. For example, if in the second group the force $P_1$ is measured by all four half-bridges 1a and b, 3a and b, 5a and b, 7a and b, which are all deformed in the same manner, the torques $M_2$ or $M_3$, in contrast, are measured by the half-bridges 3a and b, 7a and b or 1a and b, 5a and b. FIG. 7 illustrates the appropriate circuitry for the half-bridges.

When measuring $-P_1$ (see FIG. 7c), all a-strips are elongated (increase of the electrical resistance), and all b-strips are compressed (reduction of the electrical resistance), so that the electrical potentials 21, 22 shift in opposite directions. This circuitry does not react to torque, since under the load $M_3$, for example, the measuring strips 1a and 5a react in opposite directions; the same applies for the measuring strips 1b and 5b, while the remaining measuring strips do not react at all to torsion. However, the circuitry 7b reacts well to the load $M_3$, and the circuitry 7a reacts well to the load $M_2$. Since the circuitries of FIGS. 7a and 7b on the one hand, and the circuitry 7c, cannot be realized with the same extension-measuring strips, German Offenlegungsschrift No. 32 13 319 A1, for example, FIGS. 6, 7, provides for two layers of extension-measuring strips.

FIG. 8 illustrates a circuitry that reacts to torque. Inventively, the second layer of extension-measuring strips required by the heretofore known arrangement is eliminated by feeding the electrical potentials 23 to 26 simultaneously to two groups of measurement amplifiers. The amplifiers MV1 and MV2 register the moments $M_3$, $M_2$ in a manner similar to that accomplished by the circuitry 7b, 7a; the potential differences measured by the measurement amplifiers MV3 and MV4 are fed to a summation circuitry having the straight forward operational amplifier OV, whereby the force $P_1$ is measured as was done in the circuitry of FIG. 7c. Analogous deliberations apply to the measurement of $M_1$, $P_2$, $P_3$.

Figure 4A:
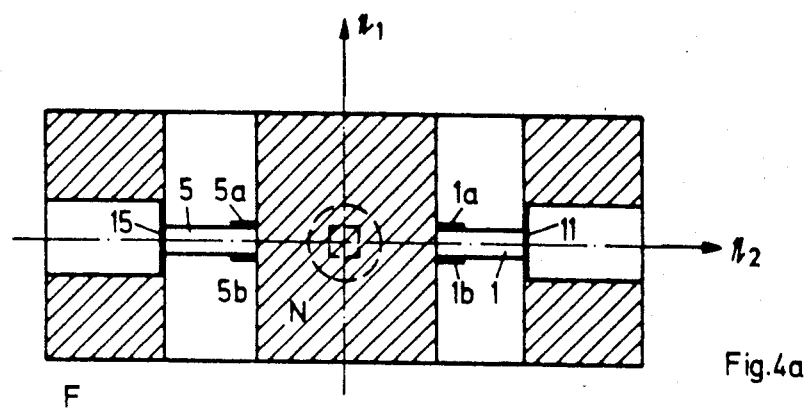
FIG. 4a is a cross-sectional view, in a vertical plane, through one exemplary embodiment of the present invention.
Figure 4B:
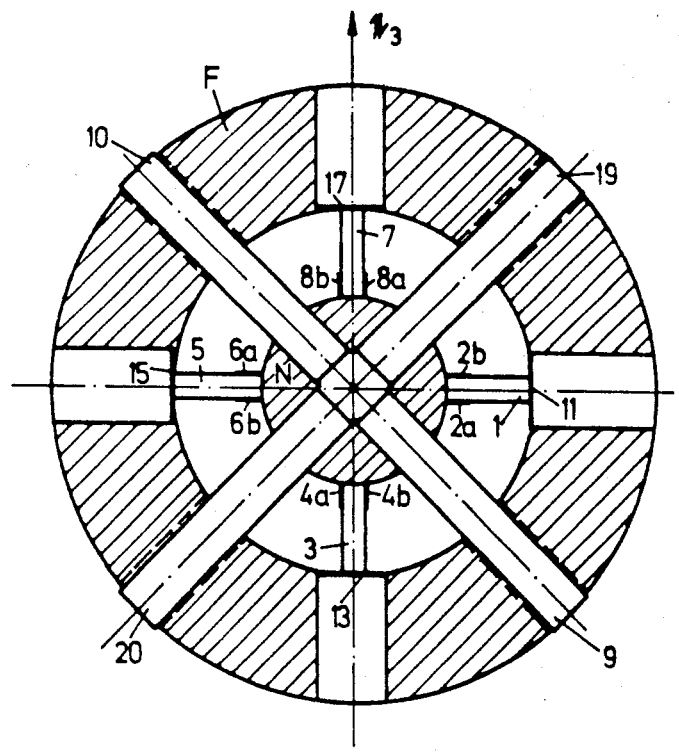
FIG. 4b is a cross-sectional view, in a horizontal plane, through one exemplary embodiment of the present invention.

In conclusion, it should be noted that the inventive construction makes it possible to have an extremely simple mechanical protection against mechanical overload. As shown in FIGS. 4a and 4b, four bores are provided on the hub N, with four bores in the flange F being provided concentric to the bores of the hub. Safety bolts 9, 10, 19, 20 are inserted in these bores. The bores in the hub have a very narrow tolerance, whereas the bores in the outer flange have approximately 0.1 mm play, so that when load in the measuring range is encountered, the hub and the flange can twist and turn relative to one another without interference, yet are prevented from deforming to too great an extent during overload.

Finally, it should be noted that the sensor illustrated in FIGS. 4a and 4b can be made of a single piece, thus avoiding undesired effects that can occur at the locations of joints. On the other hand, it is also possible, for example, to fabricate the spokes separately, which permits precise alignment of the elongation-measuring strips; the spokes are then subsequently mounted. In this latter situation, it is possible, in place of the solid profiles (with a square or round cross section) to also utilize hollow profiles (square box-shaped members or tubes) in order to have the torsional strength has small as possible relative to the bending resistance or flexural stiffness.

The present invention is, of course, in no way restricted to the specific disclosure of the specification and drawings, but also encompasses any modifications within the scopy of the appended claims.

What I claim is:

1. In a device for measuring forces and torque in different directions, said device including a rigid, round hub and an annular flange that is disposed parallel to said hub, with said flange and said hub being connected with one another via four spokes that are arranged in the shape of a cross, are secured in said hub, and are deformed by a load due to their dimensions, with such a deformation being measured with the aid of elongation-measuring strips, with said hub and said flange themselves remaining rigid, the improvement wherein: each of said spokes has an outer end remote from said hub, with each outer end being secured to said flange via a respective thin, circular member, the thickness and diameter of which are such that each member yields readily in response to deflection and pivoting of said spokes about tangential axes, while tangential displacements are substantially eliminated; the diameter of each of said circular members is at least 2.5 times as great as the diameter of said spokes, and the thickness of each such member has an upper limit defined by the equation $$\frac{f_{member}}{f_B} = \frac{k_1 \beta^2}{4}\left(\frac{a^2}{hl}\right)^3 \geqq 10$$

where $f_{member}$ is the maximum deflection of the member, $f_B$ is the maximum deflection of the spoke, $k_1$ is a function of $\beta$, $\beta$ equals $2R/a$, R is the radius of the member, a is the thickness of the spoke, h is the thickness of the member, and l is the length of the spoke.

2. A device according to claim 1, in which said elongation-measuring strips are utilized in a dual role and comprise half bridges, the potentials of which are fed both to a first group of measurement amplifiers that measure force, as well as to a second group of measurement amplifiers that measure torque.

3. A device according to claim 2, in which said hub and said flange are provided with bores, with safety bolts being fixedly disposed in the bores of said hub, and the same safety bolts being disposed with play in the bores of said flange to allow for deformation within the measuring range.

4. A device according to claim 3, in which each of said spokes has a solid profile with a square cross-sectional shape.

5. A device according to claim 3, in which each of said spokes has a solid profile with a round cross-sectional shape.

6. A device according to claim 3, in which each of said spokes has a hollow profile in the shape of a square box.

7. A device according to claim 3, in which each of said spokes has a hollow profile in the shape of a tube.

* * * * *